Sept. 25, 1928.
W. J. McCARTY
1,685,332
FOOT OPERATED STEERING GEAR
Filed Aug. 28, 1924
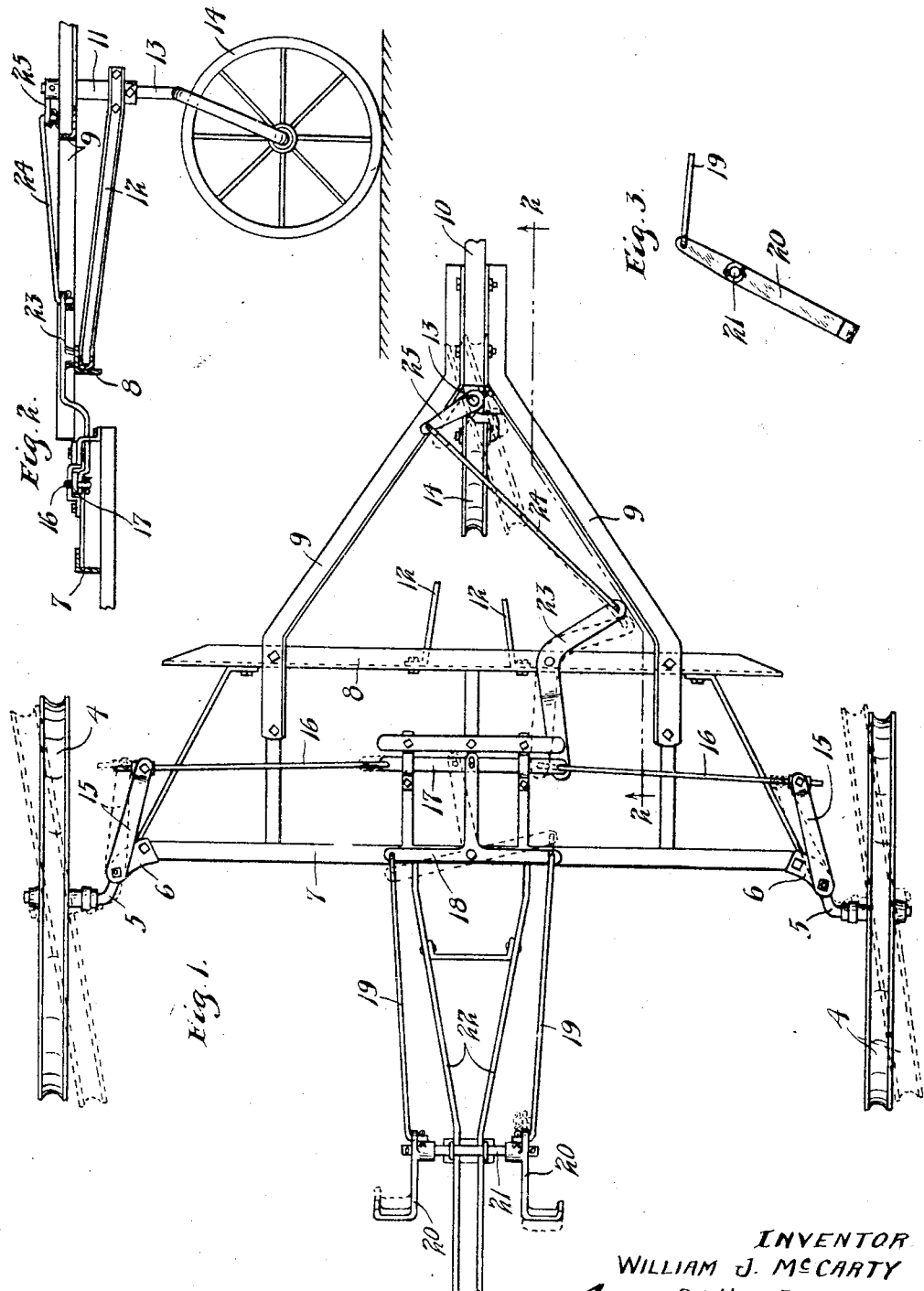
INVENTOR
WILLIAM J. McCARTY
BY HIS ATTORNEY.
James F. Williamson Patented Sept. 25, 1928.

1,685,332

UNITED STATES PATENT OFFICE.

WILLIAM J. McCARTY, OF MURDOCK, MINNESOTA.

FOOT-OPERATED STEERING GEAR.

Application filed August 28, 1924. Serial No. 734,617.

This invention relates to a cultivator, such as is generally used to cultivate corn, and particularly to a novel steering mechanism therefor. While the invention is applicable to various types of cultivators, it is illustrated as applied to the ordinary double four-horse cultivator. Such cultivators commonly comprise a frame supported on two main wheels, said wheels being swingable about vertical axes for steering the cultivator and a castor wheel is generally provided at the forward portion of the cultivator.

It is an object of this invention to provide a simple and efficient means for turning the castor wheel to steer and guide the cultivator when the main wheels are turned.

It is more specifically an object of the invention to provide a shaft carrying the castor wheel with a laterally extending arm and to provide a lever on the frame connected at one end to the steering mechanism for the main wheels and at its other end connected by a rod to said arm.

These and other objects and advantages of the invention will be fully set forth in the following description made in connection with the accompanying drawings in which like reference characters refer to the same parts throughout the different views and in which Fig. 1 is a plan view of the cultivator, the main and castor wheels being shown in a different position in dotted lines;

Fig. 2 is a vertical section taken on the line 2—2 of Fig. 1; and

Fig. 3 is a fragmentary view in side elevation of the device.

Referring to the drawings, a cultivator is shown, of which it will be only necessary to consider the main wheels 4 supported upon the stub axles 5, which axles are provided with vertical portions journaled in bearings 6 at each side of the frame and in which said axles are swingable about vertical axes. The frame of the cultivator is thus mainly supported upon the wheels 4 and comprises spaced cross members 7 and 8 and the longitudinally extending members 9 which converge at their forward ends where they are provided with parallel portions bolted to each side of the tongue 10. A bearing 11 is supported at the front of the frame by the members 9 and brace members 12, said members 12 being secured to the cross member 8 at their rear ends. A shaft 13 is journaled in the bearing 11 and extends below the same where it is offset to have a downwardly extending portion bent into horizontal position at its lower end to form the axle of the castor wheel, said shaft thus extending along one side of said wheel. The cultivator has heretofore been steered by swinging the wheels 4 about the vertical axes of the axles 5 and for this purpose arms 15 are secured to the top of said axles, forked at their front ends to engage collars adjustably secured to rods 16 extending inwardly at each side of the frame from the arms 15. The arms 16 are connected at their inner ends to each end of a transverse bar 17 connected by a slot and pin connection to the forwardly projecting central arm of a T-shaped member 18 centrally pivoted at its rear side in the frame member 7. This member 18 has the ends of its rear and cross bar connected by links 19 to the upper ends respectively of a pair of levers 20, which levers are journaled on a rod or shaft 21 secured in the rear portion 22 of the frame. The lower ends of levers 20 are formed as pedals and are adapted to be engaged by the feet of the operator for swinging levers 20 and pulling upon the links 19 to thereby swing members 18 and, through members 16 and 17, swing arms 15 and the wheels 4 to guide the cultivator.

In accordance with the present invention, a lever illustrated as a bell crank lever 23 is pivoted to the cross bar 8 and has a rearwardly projecting arm pivoted to the steering mechanism for the wheels 4 preferably, as illustrated, to one of the links 16 where the latter connects with cross bar 17. The other arm of lever 23 extends forwardly and outwardly and is pivotally connected by a link rod 24 to the end of an arm 25 secured to the upper end of the castor wheel shaft 13.

When the cultivator is being pulled through the corn by the horses, and it is desired to guide the same to properly aline with the rows of corn, the operator will operate the levers 20, as usual, to move the wheels 4. This movement, as already described, will move members 16 and 17 and the lever 23 will thus be swung about its pivot. This swinging motion of lever 23 will, in turn, swing the arm 25 and the castor wheel 14 will be turned in the same direction as the main wheels 4. The cultivator is thus more easily and effectively guided than when merely the main wheels are turned. Owing to the fact that the castor wheel is some distance ahead of the main wheels, the forward arm of lever 23 is considerably shorter than the rear arm and laterally inclined. The arm 25 is substantially half the length of the arm 15 so that the castor wheel will be more quickly turned, and turned through a greater angle than the main wheels, said angle in practice being preferably about twice the angle of the main wheels. By turning the castor wheel it is unnecessary for the operator to give his attention to guiding the horses and he can thus devote more time to watching the corn. This enables the operator to plow more closely to the corn and thus secure better cultivation and a cleaner field. Also by turning the castor wheel an easier steering operation is provided and corn which has been unevenly check-rowed or planted can be more easily cultivated. The horses will move with the cultivator, and, as stated, do not have to be guided by the operator so that there is less pulling and hauling on the horses and their work is considerably lightened. The main wheels have heretofore been swung to steer the device and in this operation the wheels were often turned to dodge the stalks of corn. With applicant's arrangement, by swinging the free castor wheel a greater distance than the said wheel, the swinging movement also guides the cultivator so that the same need not necessarily be guided by the horses, but its direction is changed by the turning movement of the castor wheel and of the main wheels.

From the above description it is seen that applicant has provided a very simple and efficient mechanism by which more and better work can be done by the cultivator and done with more ease to the operator and horses. The invention can be readily applied to any standard cultivator either when the same is originally assembled, or after the same has been in use. The device is quite simple and can be provided at small expense and the same is rugged in construction and easily maintained. The device has been amply demonstrated in actual practice and found to be very successful and efficient.

It will, of course, be understood that various changes may be made in the form, arrangement, details and proportions of the parts without departing from the scope of applicant's invention, which, generally stated consists in carrying out the objects stated, such as shown and described and defined in the appended claims.

What is claimed is:

1. A cultivator having in combination, a frame, a pair of main wheels therefor mounted to swing about vertical axes, arms for swinging said wheels, a castor wheel adjacent the front of said frame, a vertical spindle carrying said castor wheel journaled in said frame, a much shorter arm secured to said spindle, a member movable transversely of said frame and connected to said first mentioned arms for swinging said main wheels, a bell crank lever pivoted on said frame about a vertical axis having one end connected to said arm, and having another end connected to said member, a T-shaped lever pivoted about a vertical axis for moving said member in either direction, and means actuated by the operator for moving said T-shaped lever whereby when said main wheels are swung through a certain angle, said castor wheel will be simultaneously swung through a greater angle.

2. A cultivator having in combination, a frame, a pair of main wheels therefor mounted to swing about vertical axes, a castor wheel adjacent the front of said frame, a vertical spindle carrying said castor wheel journaled in said frame, a short arm secured to said spindle, a pair of foot levers, a T-shaped lever pivoted at the junction of its arms to said frame about a vertical pivot, links connecting the ends of the cross member of said T-shaped lever respectively to said foot levers, a member connected to the main wheels for simultaneously swinging the same in the same direction, and a bell crank lever having one arm connected to said first mentioned short arm, and the other attached to said last mentioned member whereby when said foot levers are operated, said main wheels and castor wheel will be simultaneously swung.

In testimony whereof I affix my signature.

WILLIAM J. McCARTY.